(12) United States Patent
Ringer et al.

(10) Patent No.: US 10,589,139 B2
(45) Date of Patent: Mar. 17, 2020

(54) MODULAR VALVE ASSEMBLY

(71) Applicant: Globe Fire Sprinkler Corporation, Standish, MI (US)

(72) Inventors: Yoram Ringer, Providence, RI (US); Kevin Desmond Maughan, North Kingstown, RI (US); Thomas Edwin Archibald, Midland, MI (US); Stephen J. Meyer, Chester Springs, PA (US)

(73) Assignee: Victaulic Company, Easton, PA (US)

(*) Notice: Subject to any disclaimer, the term of this patent is extended or adjusted under 35 U.S.C. 154(b) by 0 days.

(21) Appl. No.: 15/874,479

(22) Filed: Jan. 18, 2018

(65) Prior Publication Data

US 2018/0140881 A1 May 24, 2018

Related U.S. Application Data

(62) Division of application No. 15/402,840, filed on Jan. 10, 2017.

(Continued)

(51) Int. Cl.
| | |
|---|---|
| *A62C 35/68* | (2006.01) |
| *A62C 35/60* | (2006.01) |
| *F16K 15/03* | (2006.01) |
| *F16K 1/22* | (2006.01) |
| *F16K 17/04* | (2006.01) |
| *F16K 37/00* | (2006.01) |

(52) U.S. Cl.
CPC .............. *A62C 35/68* (2013.01); *A62C 35/60* (2013.01); *F16K 1/22* (2013.01); *F16K 15/033* (2013.01); *F16K 17/048* (2013.01); *F16K 37/005* (2013.01); *A62C 35/605* (2013.01)

(58) Field of Classification Search
CPC ....... A62C 35/68; A62C 35/60; A62C 35/605; F16K 1/00; F16K 27/00
USPC ............................................ 137/269; 169/16
See application file for complete search history.

(56) References Cited

U.S. PATENT DOCUMENTS

| RE11,988 E | 5/1902 | Gray |
|---|---|---|
| 1,359,327 A | 11/1920 | Campbell |

(Continued)

FOREIGN PATENT DOCUMENTS

| JP | 2000176040 A | 6/2000 |
|---|---|---|
| JP | 2014188092 A | 10/2014 |
| KR | 20130046053 A | 5/2013 |

OTHER PUBLICATIONS

Int'l Preliminary Report on Patentability dated Jan. 29, 2018 in Int'l Application No. PCT/US2017/021882.

(Continued)

*Primary Examiner* — Viet Le
*Assistant Examiner* — Qingzhang Zhou
(74) *Attorney, Agent, or Firm* — Panitch Schwarze Belisario & Nadel LLP

(57) ABSTRACT

A wet piping system modular valve assembly includes a single piece valve body with a check valve within the valve body. The check valve is movable between a closed position and an open position according to a pressure differential across the check valve. A drain valve is removably mounted to the valve body and fluidly connected with the valve body downstream of the check valve. A mechanically independent flow detection switch is removably mounted to the valve body and fluidly connected with the valve body upstream of the drain valve.

8 Claims, 13 Drawing Sheets

Related U.S. Application Data

(60) Provisional application No. 62/373,626, filed on Aug. 11, 2016.

(56) References Cited

U.S. PATENT DOCUMENTS

| | | | |
|---|---|---|---|
| 2,667,934 A | 2/1954 | Rowley | |
| 3,448,442 A | 6/1969 | Hube | |
| 3,451,482 A | 6/1969 | Kjaergaard | |
| 3,809,112 A | 5/1974 | Herbello | |
| 3,883,111 A | 5/1975 | Jourdan | |
| 3,897,804 A | 8/1975 | Buck et al. | |
| 4,367,861 A | 1/1983 | Bray et al. | |
| 4,643,224 A | 2/1987 | Rung et al. | |
| 4,665,078 A | 5/1987 | Sach | |
| 4,729,403 A | 3/1988 | Roche | |
| 4,741,361 A | 5/1988 | McHugh | |
| 4,852,610 A | 8/1989 | McHugh | |
| 4,971,109 A | 11/1990 | McHugh | |
| 4,991,655 A | 2/1991 | McHugh | |
| 5,103,862 A | 4/1992 | McHugh | |
| 5,154,232 A | 10/1992 | McHugh | |
| 5,295,503 A | 3/1994 | Meyer et al. | |
| 5,297,635 A | 3/1994 | McHugh | |
| 5,439,028 A | 8/1995 | Meyer et al. | |
| 5,669,405 A * | 9/1997 | Engelmann | A62C 35/68 137/107 |
| 5,944,051 A | 8/1999 | Johnson | |
| 5,971,080 A | 10/1999 | Loh et al. | |
| 6,076,545 A * | 6/2000 | Cooper | A62C 35/68 137/360 |
| 6,186,169 B1 | 2/2001 | McHugh | |
| 6,196,262 B1 | 3/2001 | Giacomini | |
| 6,333,689 B1 | 12/2001 | Young | |
| 6,396,404 B1 | 5/2002 | McHugh | |
| 6,601,604 B1 | 8/2003 | Cooper | |
| 6,857,478 B1 | 2/2005 | Weber | |
| 6,860,331 B2 | 3/2005 | Hagen et al. | |
| 7,147,002 B2 | 12/2006 | Reilly | |
| 7,845,424 B1 | 12/2010 | Miller | |
| 8,051,915 B2 | 11/2011 | Blease et al. | |
| 8,128,058 B2 * | 3/2012 | Quinn | F16K 1/2028 251/288 |
| 8,333,214 B2 | 12/2012 | Ellis | |
| 8,727,029 B2 | 5/2014 | Feenstra | |
| 8,727,030 B2 | 5/2014 | Feenstra | |
| 8,813,859 B2 | 8/2014 | Schlatter | |
| 9,022,132 B2 | 5/2015 | Feenstra | |
| 9,032,994 B2 | 5/2015 | McHugh et al. | |
| 9,265,980 B2 | 2/2016 | Johnson | |
| 2002/0014270 A1 * | 2/2002 | McHugh | F16K 11/0873 137/601.16 |
| 2002/0108759 A1 * | 8/2002 | Hagen | A62C 35/68 169/23 |
| 2004/0231862 A1 | 11/2004 | Kim et al. | |
| 2006/0213556 A1 | 9/2006 | Royse | |
| 2007/0289751 A1 | 12/2007 | Feenstra et al. | |
| 2008/0099073 A1 * | 5/2008 | Lauber | B67D 7/3218 137/68.14 |
| 2008/0308159 A1 | 12/2008 | Stunkard | |
| 2009/0001309 A1 | 1/2009 | Sprakel et al. | |
| 2010/0132806 A1 | 6/2010 | Burczynski | |
| 2011/0120737 A1 * | 5/2011 | Flynn | A62C 31/02 169/90 |
| 2011/0253395 A1 * | 10/2011 | Long | A62C 35/62 169/17 |
| 2012/0055686 A1 * | 3/2012 | McHugh, IV | A62C 35/62 169/17 |
| 2012/0103637 A1 * | 5/2012 | Karihara | A62C 35/68 169/19 |
| 2014/0374125 A1 * | 12/2014 | Johnson | A62C 35/68 169/16 |
| 2015/0192216 A1 * | 7/2015 | Mesner | F25B 41/06 137/269 |
| 2016/0008645 A1 | 1/2016 | Deurloo | |

OTHER PUBLICATIONS

Int'l Search Report dated May 22, 2017 in Int'l Application No. PCT/US2017/021882.

Office Action dated May 9, 2018 in U.S. Appl. No. 15/402,840 by Ringer.

Office Action dated Sep. 7, 2018 in U.S. Appl. No. 15/402,840, by Ringer.

Office Action dated Dec. 27, 2018 in U.S. Appl. No. 15/402,840, by Ringer.

Office Action dated Apr. 15, 2019 in U.S. Appl. No. 15/402,840, by Ringer.

* cited by examiner

MODULAR VALVE ASSEMBLY

CROSS-REFERENCE TO RELATED APPLICATIONS

This application is a divisional application of similarly titled U.S. application Ser. No. 15/402,840, filed on Jan. 10, 2017, which claims priority from U.S. Provisional Patent Application No. 62/373,626, titled "Modular Control Valve Assembly", filed on Aug. 11, 2016, the entire contents of each of which are incorporated by reference herein.

BACKGROUND OF THE INVENTION

The present invention is generally directed to a fluid flow valve assembly, and more particularly to a valve assembly for a sprinkler wet standpipe used to monitor and optionally control water released to downstream sprinklers of a fire suppression sprinkler system.

Fire suppression sprinkler systems designed for protection of commercial and non-commercial properties include some combination or all of a control valve, a check valve, a water flow detection switch, a test valve, a drain valve and a pressure relief valve. A control valve is utilized to allow water flow to the sprinklers downstream thereof to be shut off, e.g., for maintenance purposes. A check valve retains fluid and pressure downstream in the fire protection system so that during periods such as supply side system maintenance, fluid and pressure are retained in the system downstream of the check valve. A flow detection switch is utilized at least to sound an alarm when the sprinklers are activated. A test valve is utilized for testing of the sprinkler system and a drain valve is utilized for draining the sprinkler system, e.g., also for maintenance purposes. A pressure relief valve is utilized to ensure that the water pressure within the sprinkler system does not surpass a safe level.

These items are available individually from various commercial suppliers. Conventionally, the test and drain valves, the pressure relief valve and the water flow detection switch are mounted separately to respective conduits along a large manifold/network of piping proximate the control valve and/or check valve during installation of sprinkler systems. Consequently, the manifold of piping of the sprinkler system has a relatively large footprint, is costly to manufacture and is both time consuming, complicated and costly to assemble. As one example, the largest sprinkler system control valves (eight inches or more in diameter), in combination with the piping manifold, conduits and accessories mounted thereon, typically weigh several hundred pounds.

Therefore, it would be advantageous to manufacture a modular valve assembly having a compact footprint, with the control valve, the check valve, the flow detection switch, the test valve, the drain valve and a pressure relief module, or some combination thereof, mounted thereto, thereby eliminating the large manifold of piping and the associated footprint, as well as minimizing the cost and time of manufacture and complex assembly thereof.

BRIEF SUMMARY OF THE INVENTION

Briefly stated, one aspect of the present invention is directed to a wet piping system modular valve assembly. The assembly comprises a single piece valve body having a check valve within the valve body. The check valve is movable between a closed position and an open position according to a pressure differential across the check valve. A drain valve is removably mounted to the valve body and fluidly connected with the valve body downstream of the check valve. A mechanically independent flow detection switch is removably mounted to the valve body and fluidly connected with the valve body upstream of the drain valve.

Another aspect of the present invention is directed to a wet piping system modular valve assembly comprising a single piece valve body having a control valve within the valve body. The control valve has a selectively rotatable control arm operatively coupled therewith to move the control valve between an open position, permitting fluid flow across the control valve, and a closed position, substantially preventing fluid flow across the control valve. A drain valve is removably mounted to the valve body and fluidly connected with the valve body downstream of the control valve. A mechanically independent flow detection switch is removably mounted to the valve body and fluidly connected with the valve body upstream of the drain valve.

Another aspect of the present invention is directed to a wet piping system modular valve assembly comprising a single piece valve body and a spool pipe removably connected to the valve body. A check valve is located within the valve body and is movable between a closed position and an open position according to a pressure differential across the check valve. A drain valve is removably mounted to the valve body and fluidly connected with the valve body downstream of the check valve. A mechanically independent flow detection switch is removably mounted to the spool pipe and fluidly connected with the valve body upstream of the check valve and the drain valve.

BRIEF DESCRIPTION OF THE DRAWINGS

The following detailed description of preferred embodiments of the invention will be better understood when read in conjunction with the appended drawings. It should be understood, however, that the invention is not limited to the precise arrangements and instrumentalities shown. In the drawings.

DETAILED DESCRIPTION OF THE INVENTION

Figure 1:
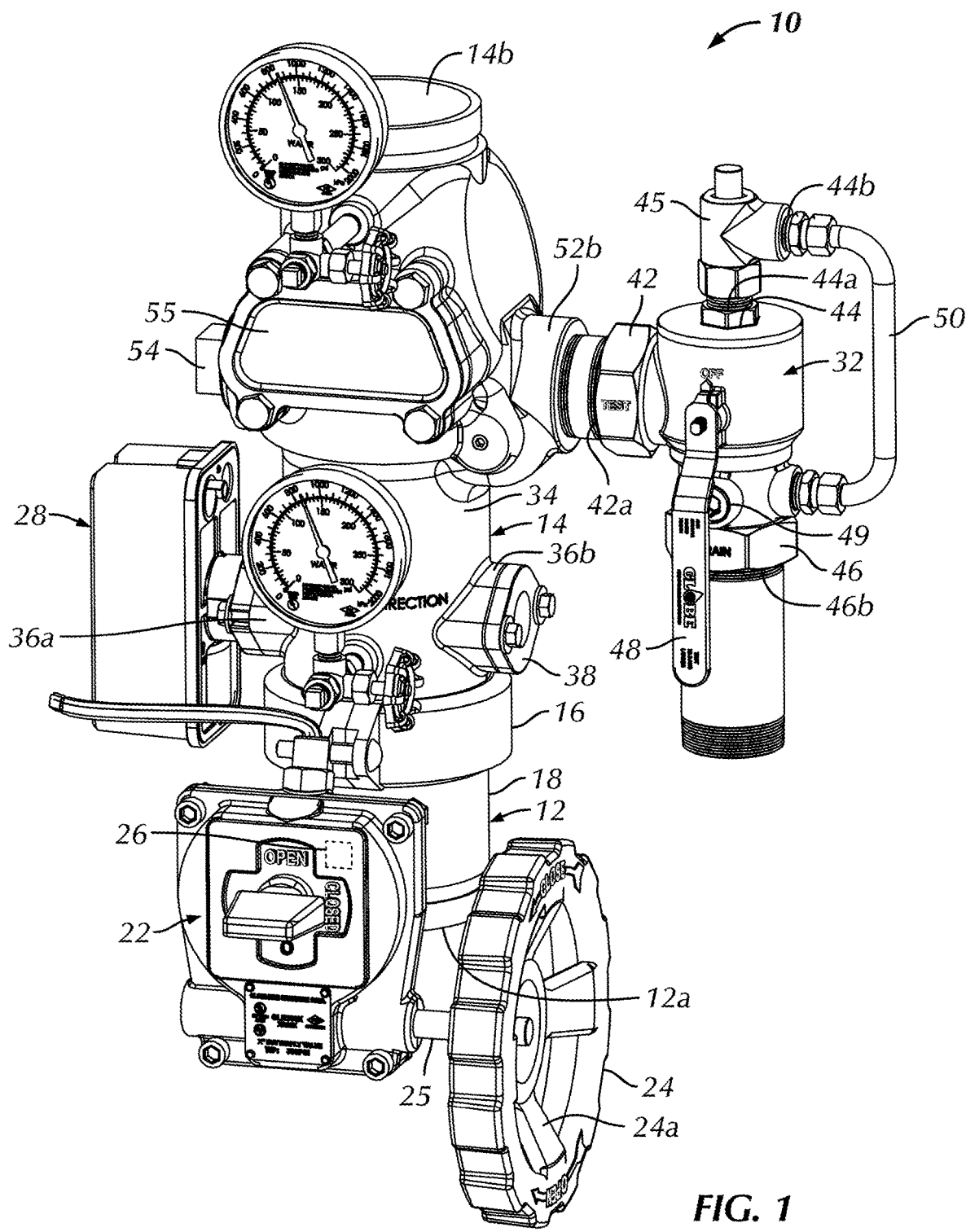
FIG. 1 is a perspective front and side view of a two piece modular control valve assembly according to a first embodiment of the present invention.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the control valve assembly, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-5 a piping system modular valve assembly ("MVA"), generally designated 10, in accordance with a first preferred embodiment of the present invention. Generally, the MVA 10 is utilized in a wet standpipe (not shown) for a multi-floor property sprinkler system (not shown). As should be understood by those of ordinary skill in the art, the wet standpipe extends generally vertically through the floors of the property, and an MVA 10 branches off of the standpipe at each of the respective floors. Each MVA 10 of a respective floor connects water in the standpipe with the sprinklers on that respective floor. The MVA 10 may also control draining of the sprinkler system for testing and maintenance, and where the MVA 10 includes a control valve (as described in detail further below), the MVA 10 may also control shutting off water flow to the sprinklers, e.g., at the end of a fire.

The MVA 10 of FIGS. 1-5 is comprised of two main components: an upstream control assembly 12 in series with a downstream check valve assembly 14, connected together by a mechanical coupling 16 in a manner well understood by those of ordinary skill in the art. The control assembly 12 defines a main inlet 12a of the MVA 10 at a base end thereof (according to the orientation of the MVA 10 depicted in FIGS. 1, 2) for receiving water from the wet standpipe, and the check valve assembly 14 defines a main outlet 14b of the MVA 10 at an uppermost end thereof (according to the same orientation of the MVA 10 depicted in FIGS. 1, 2), through which water exits from the MVA 10 to the sprinklers (not shown). In the illustrated embodiment, both ends 12a, 14b have respective outer peripheral grooves for mating in a conventional fashion with other fittings or pipe lengths. Alternatively, the ends 12a, 14b could be threaded, flanged or the like for other types of conventional mating.

The control assembly 12 controls manual shut-off of the MVA 10 for maintenance purposes or to turn off sprinklers once a fire event is extinguished. As should be understood by those of ordinary skill in the art, aside from closing the MVA 10 for maintenance purposes the MVA 10 should generally be fully open at all times in order to ensure proper water flow to the sprinklers in the event of an emergency.

In the illustrated embodiment, the control assembly 12 includes a butterfly control valve 15 having a generally tubular valve body 18 with a butterfly valve disk 19 and an endless, e.g., annular, seal 17 therein, the annular seal 17 functioning as a valve seat for the butterfly disk 19 in a closed position thereof. The term "butterfly valve," as used herein, is sufficiently broad to cover any valve having a generally disk-shaped closure that is pivotable about an axis along a cross-section of a pipe, i.e., perpendicular to the direction of fluid flow, to regulate fluid flow. The valve body 18 defines the inlet end 12a at one end thereof and an opposing outlet end 12b at the other end thereof, which is in fluid communication with an inlet end 14a of the check valve assembly 14.

Openings 20a and 20b are oppositely provided in the sidewall of the valve body 18, and sealingly receive components of a valve actuation assembly indicated generally at 22. The valve actuation assembly 22 includes a hand wheel 24 (located outside of the valve body 18) having a plurality of spokes 24a, operatively connected with the butterfly disk 19 (located inside the valve body 18) in a conventional manner, e.g., via a control arm 25. As should be understood by those of ordinary skill in the art, the butterfly disk 19 is rotatable about an axis across the diameter of the valve body 18 between a closed position (not shown) (the disk 19 being oriented perpendicular to the direction of fluid flow through the valve body 18), substantially preventing fluid flow through the valve body 18, and an open position (FIG. 4) (the disk 19 being oriented generally parallel or non-perpendicularly to the direction of fluid flow through the valve body 18), permitting fluid flow through the valve body 18.

Clockwise and counterclockwise rotation of the hand wheel 24 pivots the butterfly valve disk 19 between the open and closed positions thereof in a manner well understood by those of ordinary skill in the art, corresponding to open and closed configurations of the control MVA 10, respectively. Accordingly, to manually shut-off the MVA 10, e.g., for maintenance purposes or to turn off sprinklers after a fire event is extinguished, a user rotates the hand wheel 24 to rotate the butterfly valve disk 19 into the closed position thereof. To return the MVA 10 into the normal operating condition thereof (FIG. 4), the user rotates the hand wheel 24 in the opposite direction to rotate the butterfly valve disk 19 back to the open position thereof.

Optionally, the valve actuation assembly 22 may further include a conventional, commercially available, worm gear transmission (not-shown) between the valve hand wheel 24 and the butterfly disk 19, to provide a reduction ratio. As should be understood, a worm gear transmission provides the necessary mechanical advantage to manually open and close the control assembly 12 under the operating pressure thereof.

The control assembly 12 is also provided in a conventional fashion with one or more internal supervisory switches 26, i.e., a tamper evident switch, which operate(s) in a manner well understood by those of ordinary skill in the art, and which is operatively connected to the control assembly 12 in a conventional manner. As one example, without limitation, the supervisory/tamper switch 26 can be actuated by a cam (not shown), within the valve actuation assembly 22, operatively connected to a valve stem (not shown) of the control assembly 12 in a conventional fashion so as to change the state of the switch 26 within a predetermined number of turns of the hand wheel 24. The supervisory switch 26 is also connected in a manner well understood by those of ordinary skill in the art to a monitoring system (not shown), which produces a warning signal to energize an alarm, turn on a light, or the like in the event an unauthorized person starts to open or close the control assembly 12 of the MVA 10.

Turning to the check valve assembly 14 as shown in FIGS. 1-5, the assembly 14 defines a generally tubular, single piece, e.g., integral, unitary and monolithic, valve body 34. The single piece valve body 34 fluidly connects or houses three main components of the MVA 10 as will be described in further detail below: a flow detection switch 28, a check valve 30, and a test, drain and pressure relief module 32. In the illustrated embodiment, the check valve 30 takes the form of a clapper valve. As should be understood by those of ordinary skill in the art, however, the check valve 30 is not limited to a clapper valve, and may take the form of other one-way valves substantially preventing backflow of liquid, currently known or that later become known, capable of performing the functions of the check valve 30 described herein.

The check valve 30 is positioned within the valve body 34, and includes an endless, e.g., annular, valve seat 30a and a removable clapper disk 30b which is pivotable between open (not shown) and closed (FIG. 4) positions according to the water pressure differential across the clapper disk 30b. In the closed position of the check valve 30, the clapper disk 30b sealingly engages the valve seat 30a, and in the open position of the check valve 30, the clapper disk 30b is pivoted upwardly away from the valve seat 30a and water is permitted to flow through the check valve 30 from the inlet side 14a to the outlet side 14b. A biasing member 30c, e.g., a torsion spring, pivotably mounted to the inside of the valve body 34 is attached to the clapper disk 30b. The spring 30c exerts a predetermined spring force on the clapper disk 30b to maintain the clapper disk 30b in sealed engagement with the valve seat 30a. The spring force of the spring 30c may be overcome by a pressure differential across the clapper disk 30b that results in a force against the clapper disk 30b that is greater than the spring force and opposite in direction.

As should be understood by those of ordinary skill in the art, because the MVA 10 is fluidly connected to a wet standpipe, the valve body 34 is filled with water and pressurized at all times. Water pressure differential across the valve 30 also maintains the clapper disk 30b in the closed position, i.e., water pressure is greater on the downstream side than the upstream side. When the sprinkler system is activated by a thermal event, e.g., a fire, a decrease in the water pressure on the downstream side of the valve 30, resulting from spraying of the sprinklers, causes a pressure differential across the clapper disk 30b that equates to a force greater than the spring force of the spring 30c, and, therefore, pivots the clapper disk 30b to the open position for water to flow through the valve 30 and to the sprinklers.

In the illustrated embodiment, an opening (not shown) is provided in the sidewall of the valve body 34, proximate the location of the check valve 30. The opening is sized and dimensioned to receive the check valve 30 therethrough during assembly of the check valve 30 within the valve body 34 (during manufacturing of the MVA 10). After the check valve 30 is mounted within the valve body 34, a removable cover plate 55 is sealingly fastened to the valve body 34 in a manner well understood by those of ordinary skill in the art to cover the opening, e.g., via a threaded engagement with the valve body 34. As should be understood by those of ordinary skill in the art, however, the valve body 34 may alternatively be constructed without the sidewall opening and the corresponding cover plate 55, and the check valve 30 can be assembled within the valve body via other openings, such as, for example, without limitation, via the inlet or outlet ends 14a, 14b of the valve body 34.

The flow detection switch 28 is positioned in the check valve assembly 14 upstream of the test, drain and pressure relief module 32 as will be explained in further detail below. In the illustrated embodiments of FIGS. 1-6, the flow detection switch 28 is also positioned upstream of the check valve 30. The flow detection switch 28 detects water flow from the inlet 12a to the outlet 14b of the MVA 10, and outputs a notification, e.g., sounding an alarm. Advantageously, positioning the flow detection switch 28 upstream of the test, drain and pressure relief module 32 also permits the flow detection switch 28 to detect and notify when water is being drained out of the MVA 10 through the test, drain and pressure relief module 32 (described in further detail below).

In the illustrated embodiment, the flow detection switch 28 is a conventional lever-style pressure switch. The flow detection switch 28 is mechanically independent of any valve within the MVA 10, i.e., the flow detection switch 28 is not mechanically coupled or linked to any valve within the MVA 10, and opening or closing of any valve within the MVA 10 does not mechanically actuate the flow detection switch 28. As shown best in FIG. 4, the flow detection switch 28 is actuated by lever arm 28a extending from the flow detection switch 28, through a port 36a and into the interior of the valve body 34. The lever arm 28a extends along a plane substantially perpendicular to the direction of water flow within the valve body 34. A rear end of the lever arm 28a contacts an electric switch 28b which is connected with an alarm system (not shown). Water flow through valve body 34, across the lever arm 28a, such as, without limitation, when the clapper disk 30b (which is not mechanically linked to the lever arm 28a) opens, moves, i.e., pivots, the lever arm 28a and activates the switch 28 and sounds an alarm in a manner well understood by those of ordinary skill in the art.

The flow detection switch 28 includes an adjustable time delay 28c, which is set to a predetermined period of time during which the switch 28 must remain in the activated state prior to sounding an alarm, indicating that either the sprinklers are activated or that the test, drain and pressure relief module 32 is draining water out of the MVA 10. The time delay accounts for sporadic and temporary pressure surges in the standpipe, without the sprinklers or the test, drain and pressure relief module 32 actually being activated. As should be understood by those of ordinary skill in the art, however, the flow detection switch 28 is not limited to a lever-actuated flow detection switch. For example, without limitation, the flow detection switch 28 may take the form of a magnetically-actuated flow detection switch (not shown) triggered by magnetic detection of movement of the check valve 30 or the test, drain and pressure relief module 32, a pressure-actuated flow detection switch (not shown) triggered by differential pressure across the check valve 30 or the test, drain and pressure relief module 32, and the like.

Advantageously, the valve body 34 includes a first pair of generally oppositely disposed, e.g., mirrored, ports 36a, 36b, extending through a sidewall of the valve body 34 and in fluid communication with the interior of the valve body 34. The flow detection switch 28 is selectively, removably mountable to either of the ports 36a, 36b in a manner well understood by those of ordinary skill in the art. For example, in the illustrated embodiment the flow detection switch 28 is bolted to the port 36a. As should be understood however, the flow detection switch 28 may be sealingly mounted to either of the ports 36a, 36b via any of numerous different sealing attachment methods currently known or that later become known in the art, such as a threaded attachment, a bayonet style attachment or the like. The free port of the first pair of ports 36a, 36b, i.e., not having the flow detection switch 28 mounted thereto, is sealed shut with a removable sealing plug/adapter 38, such as, for example, without limitation, a bolt or a threaded plug.

While the MVA 10 shown in FIGS. 1-5 is vertically oriented, the MVA 10 is often assembled in a horizontal configuration along the piping of a sprinkler system. Therefore, in a "left to right" horizontal configuration of the MVA 10, i.e., water flowing in a left to right direction, one of the mirrored ports 36a, 36b is positioned on the top side of the valve body 34, and in an opposing "right to left" horizontal configuration of the MVA 10, i.e., water flowing in a right to left direction, the same one of the mirrored ports 36a, 36b becomes positioned on the bottom side of the valve body 34 (the other of the ports 36a, 36b being on the top side). The flow detection switch 28 should not be mounted to a bottom side of the valve body 34 because sediment from the water flowing through the MVA 10 may collect on the bottom side of the valve body 34. Therefore, mounting of the flow detection switch 28 on a bottom side of the valve body 34 may result in sediment collecting nearby the lever arm 28a, negatively affecting the movement and operation thereof. Additionally, even after draining of the MVA 10, some residual water may remain on the bottom side of a horizontally oriented valve body 34, which is undesirable, for example, in the event that replacement of a flow detection switch 28 becomes necessary, due to the presence of electrical components.

Accordingly, having two generally diametrically opposed ports 36a, 36b in the check valve assembly 14 to select from for mounting the flow detection switch 28 thereto is advantageous, such that a user may mount the flow detection switch 28 to the port 36a or the port 36b that is positioned on the top side of the valve body 34 according to the orientation of the MVA 10 along the piping of a sprinkler system. It is also advantageous to have mirrored ports 36a, 36b in a vertical assembly of the MVA 10 as some building settings may only allow room for the flow detection switch 28 on one side of the check valve assembly 14.

Turning to the test, drain and pressure relief module 32, the test, drain and pressure relief features are combined into a single unit, fluidly connected with the valve body 34 of the check valve assembly 14 downstream of flow detection switch 28 (and downstream of the check valve 30 in FIGS. 1-6) and upstream of the outlet 14b of the MVA 10. The module 32 includes three fluidly connectable ports 42, 44, 46 and an internal flow valve 40, which directs the flow between the three ports. In the illustrated embodiment, the valve 40 takes the form of a ball valve (FIG. 4), but is not so limited. As should be understood by those of ordinary skill in the art, the valve 40 may take the form of any valve currently known, or that later becomes known, capable of performing the functions of the valve 40 described herein, such as a spool valve.

The first port 42 of the module 32 (labeled "test" in FIGS. 1, 2) is fluidly connected at an inlet side 42a thereof to the check valve assembly 14 downstream from the check valve 30, and operates as the inlet port for the module 32. An outlet 44b of the second port 44 (labeled "off" in FIGS. 1, 2) is fluidly connected via external piping 50 with the third port 46 for pressure relief (as will be explained further below). The third port 46 (labeled "drain" in FIGS. 1, 2) fluidly connects the first port 42 with a drainage pipe (not shown), and operates as the exit port for the module 32. A lever 48 controls the internal flow valve 40.

When the lever 48 is oriented in the "test" position, the internal ball valve 40 is oriented to be partially open or restricted between the first and third ports 42, 46, and fully closed to the second port 44. Accordingly, water from the check valve assembly 14 and the sprinklers flows into the module 32 from the first port 42 in a restricted manner and exits the module 32 through the outlet 46b of third port 46. A transparent window 49, downstream of the inlet orifice 46a, allows a user to see whether water is flowing into the third port 46. As should be understood, the "test" position is utilized to check whether water is present in the MVA 10 and sprinkler piping as required.

When the lever 48 is oriented in the "drain" position, the internal ball valve 40 is oriented to be fully open between the first and third ports 42, 46, and fully closed to the second port 44. Accordingly, water drains out from the check valve assembly 14 and sprinklers and into the module 32 in an unrestricted manner via the first port 42 and exits the module 32 through the third port 46. The drain position is utilized to drain water in the sprinkler piping on a respective floor, e.g., for maintenance.

When the lever 48 is oriented in the "off" position, the internal ball valve 40 is oriented to be fully open between the first port 42 and the second port 44, and fully closed to the third port 46. A one-way pressure relief valve 45 is positioned downstream of the second port 44, between the inlet orifice 44a and the piping 50. The pressure relief valve 45 preferably opens at a threshold pressure of approximately 175 psi, but some other pressure could be used.

The lever is oriented in the "off position" during normal operation of the MVA 10. Therefore, if during normal operation of the MVA 10 the water pressure therein exceeds 175 psi, the pressure relief valve 45 is opened and water flows from the check valve assembly 14, through the first port 46, through the pressure relief valve 45 in the second port 44, and is diverted through external piping 50 to the third port 46 to be drained. The purpose of the pressure relief valve 45 is to maintain appropriate water pressure at the top floors of a building without over pressurizing the bottom floors of the building.

Figure 2:
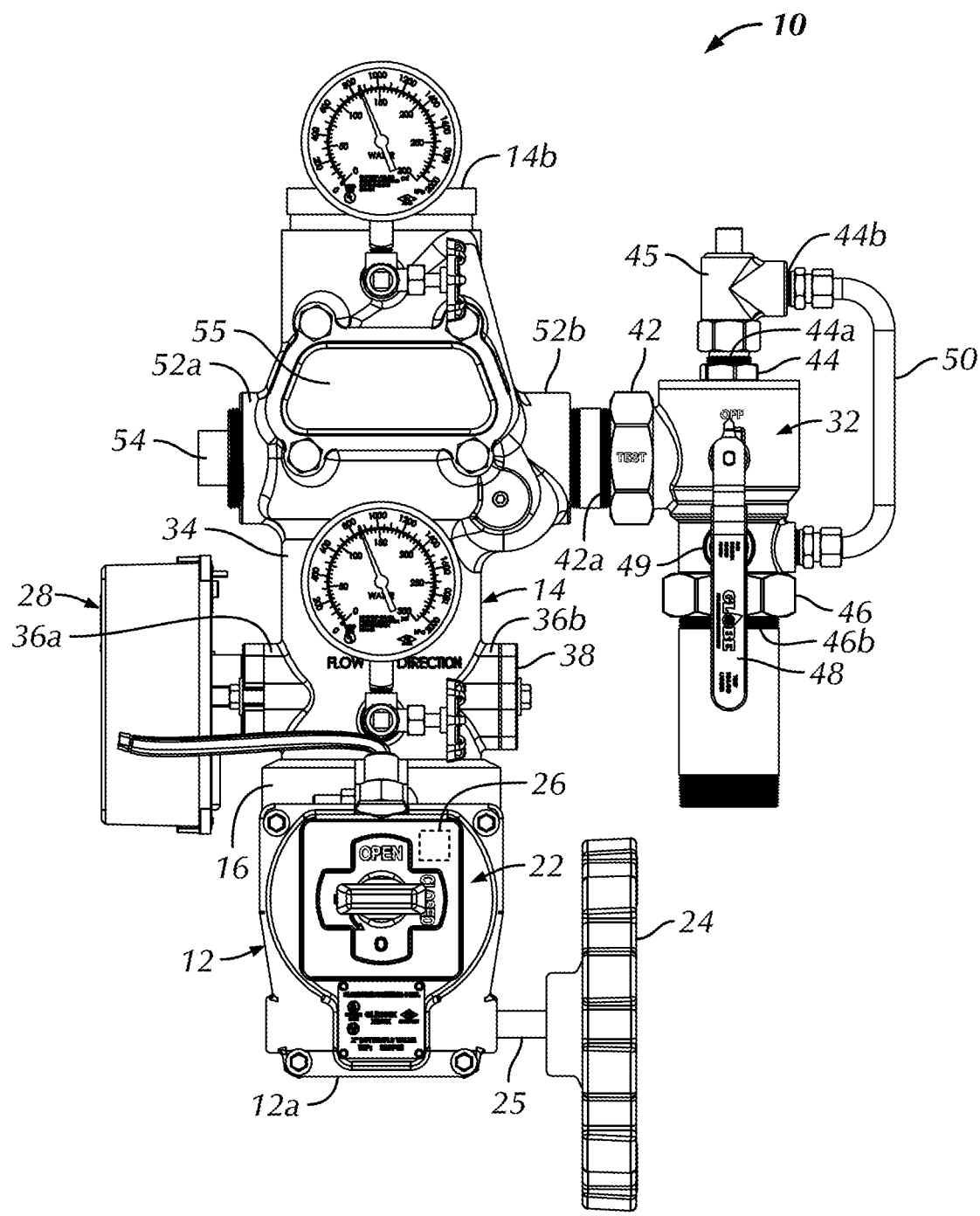
FIG. 2 is a front elevational view of the modular control valve assembly of FIG. 1.
Figure 3:
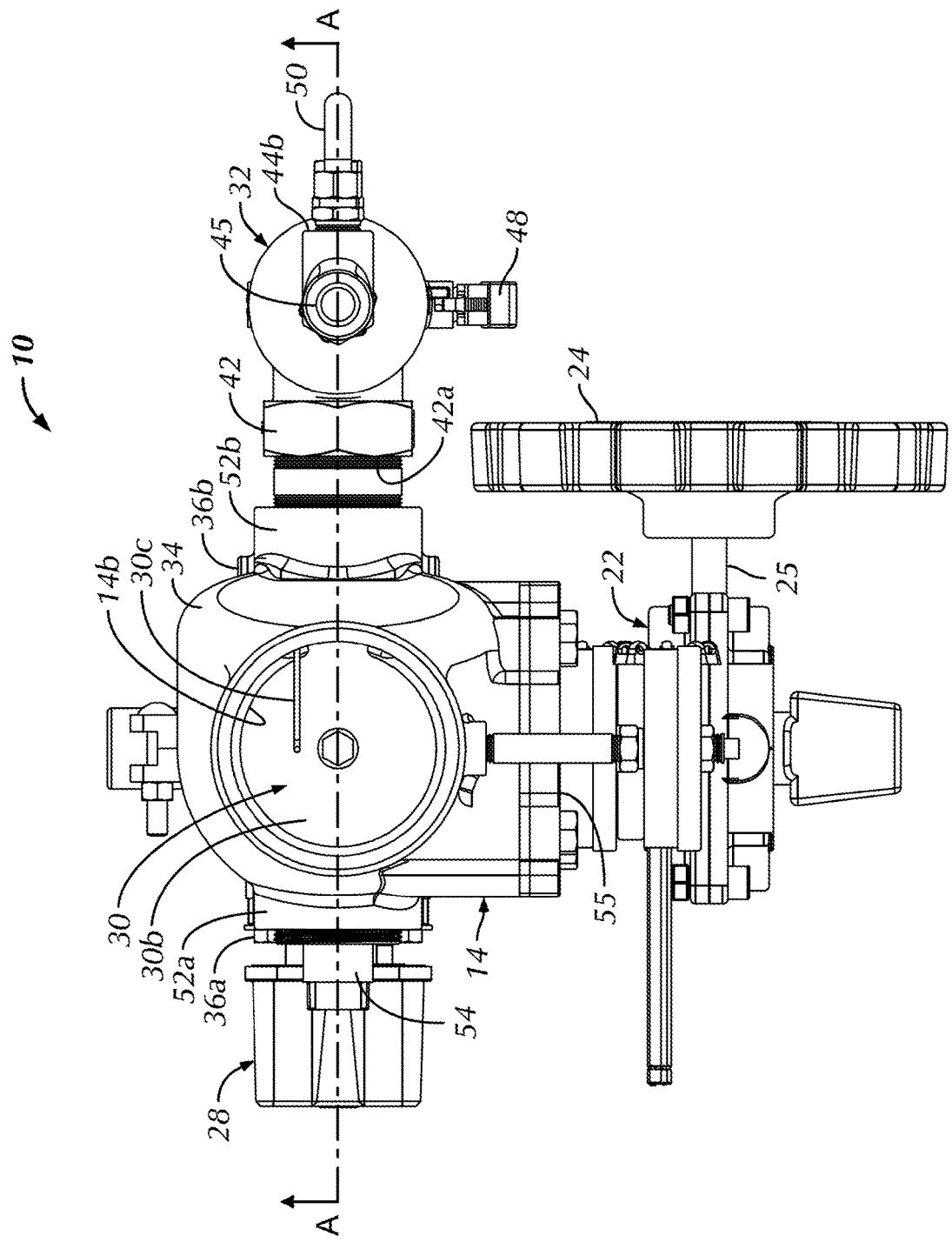
FIG. 3 is a top plan view of the modular control valve assembly of FIG. 1.
Figure 4:
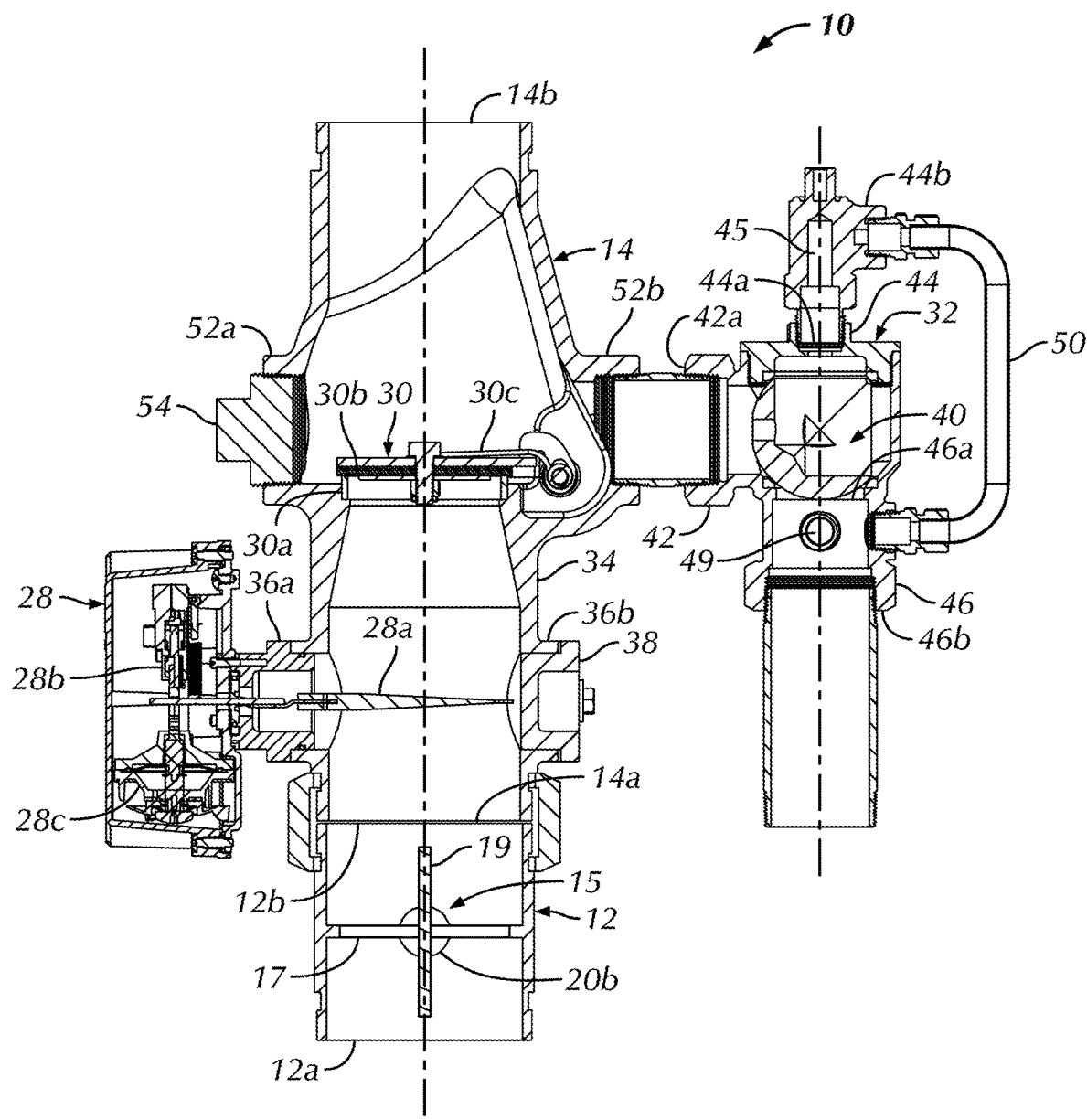
FIG. 4 is a cross-sectional view of the modular control valve assembly of FIG. 1, taken along the sectional line A-A of FIG. 3.
Figure 5:
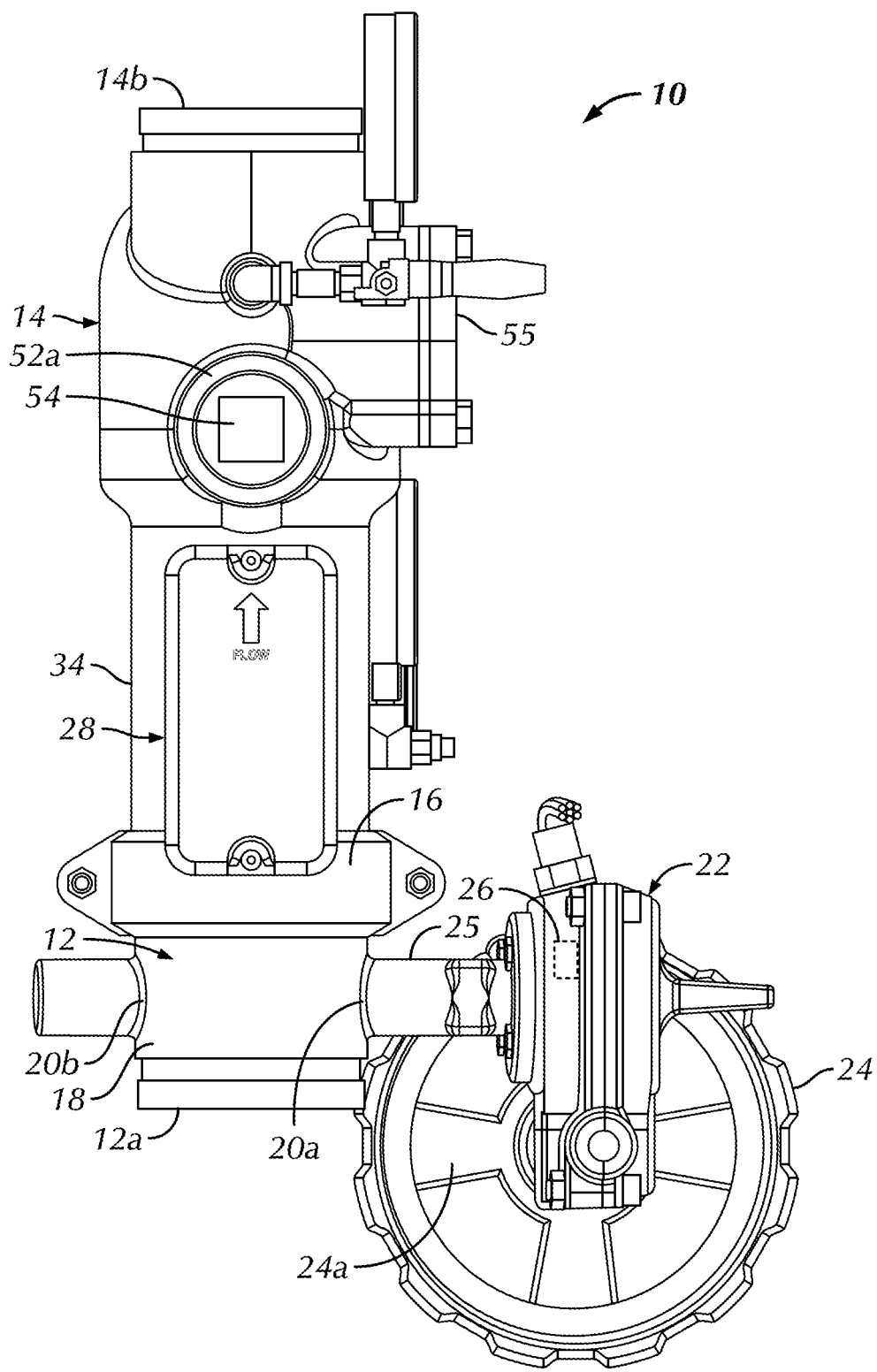
FIG. 5 is a left side elevational view of the module control valve assembly of FIG. 1.

As shown best in FIGS. 2-4, the valve body 34 includes a second pair of generally oppositely disposed, e.g., mirrored, ports 52a, 52b, extending through a sidewall of the valve body 34 and in fluid communication with the interior of the valve body 34. The second pair of ports 52a, 52b are positioned downstream of the first pair of ports 36a, 36b. The test, drain and pressure relief module 32 is selectively, removably mountable to either of the second ports 52a, 52b in a manner well understood by those of ordinary skill in the art. For example, in the illustrated embodiment the module 32 is threaded to the second port 52b. As should be understood, however, the module 32 may be mounted to either of the second ports 52a, 52b via any of numerous different sealing attachment methods currently known or that later become known in the art. The free port of the second pair of ports 52a, 52b, not having the test, drain and pressure relief module 32 mounted thereto, is sealed shut with a sealing plug/adapter 54.

As explained previously, the MVA 10 is often assembled in a horizontal configuration along the piping of a sprinkler system. In the "left to right" horizontal configuration of the MVA 10, one the second ports 52a, 52b is positioned on the top side of the valve body 34, and in the opposing "right to left" horizontal configuration of the MVA 10, the same one of the ports 52a, 52b becomes positioned on the bottom side of the valve body 34 (the other of the ports 52a, 52b being on the top side).

The test, drain and pressure relief module 32 should be mounted to the bottom side of the valve body 34 for efficient drainage capability, i.e., the water drains better flowing downwardly under the force of gravity. Accordingly, having two generally diametrically opposed second ports 52a, 52b in the check valve assembly 14 to select from for mounting the test, drain and pressure relief module 32 thereto is advantageous, such that a user may mount the test, drain and pressure relief module 32 to the port 52a or the port 52b that is positioned on the bottom side of the valve body 34 according to the orientation of the MVA 10 along the piping of a sprinkler system. It is also advantageous to have mirrored ports 52a, 52b in a vertical assembly of the MVA 10 as some building settings may only allow room for the test, drain and pressure relief module 32 on one side of the check valve assembly 14.

Combining the test, drain and pressure relief systems into a single module 32, as explained above, and mounting the flow detection switch 28 and the test, drain and pressure relief module 32 directly to the MVA 10 eliminates the need for a piping manifold, i.e., a network of interconnected pipes, positioned around the valve assembly. Rather, the MVA 10 may be directly fluidly connected at the inlet end 12a thereof to the wet standpipe and directly fluidly connected at the outlet end 14b thereof to the sprinklers, with the flow detection switch 28 and the test, drain and pressure relief module 32 directly attached. Advantageously, the footprint of sprinkler system piping is greatly reduced with the elimination of the piping manifold, as well as the associated time, cost and complexity of assembly. As should be understood by those of ordinary skill in the art, however, the test, drain and pressure relief valves may alternatively be separately and removably attached to the MVA 10. Yet further, one or more of the test, drain and pressure relief valves may be separately attached to the piping system network, upstream or downstream of the MVA 10 in a conventional manner.

Figure 6:
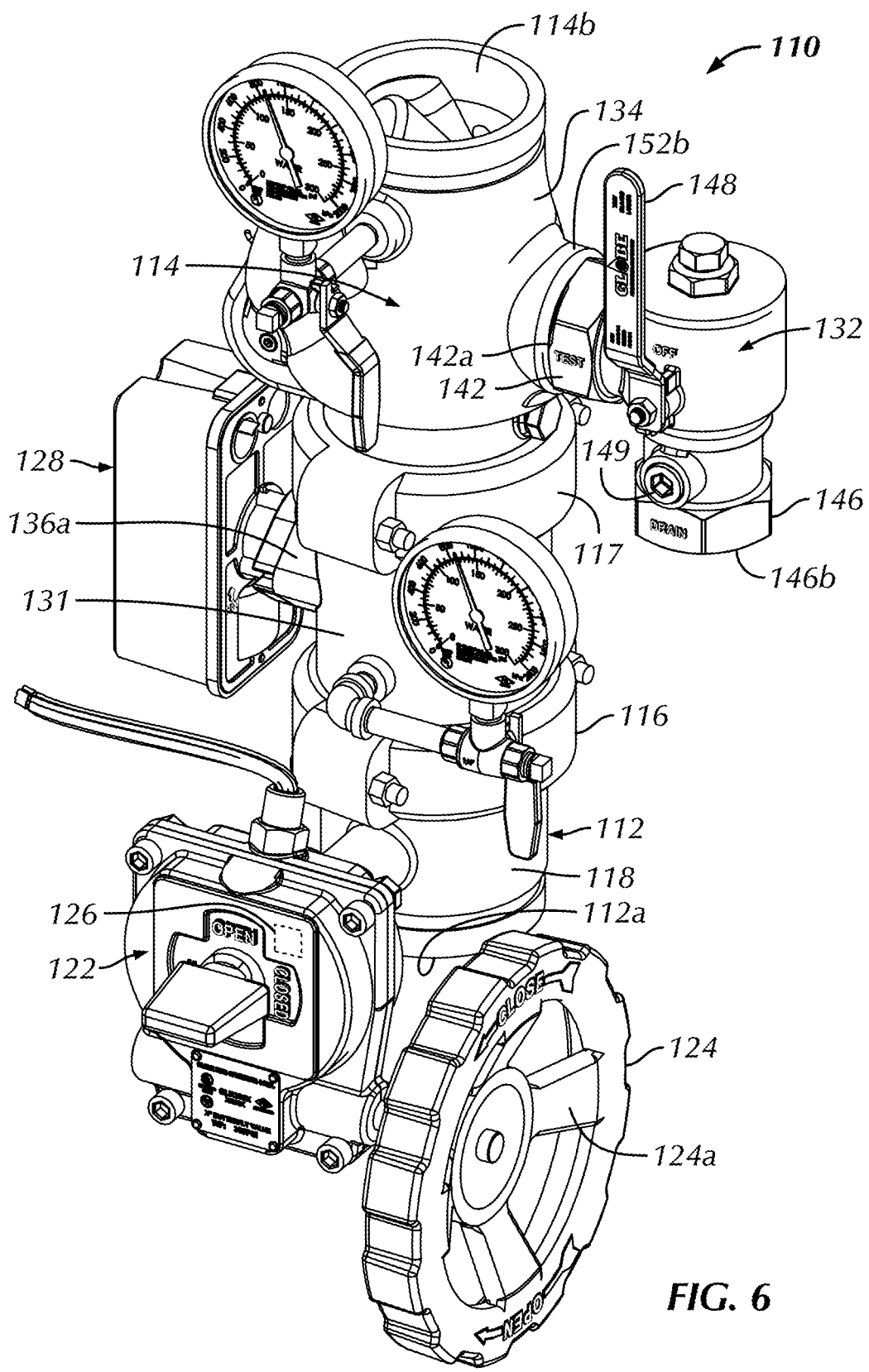
FIG. 6 is a perspective front and side view of a three piece modular control valve assembly according to a second embodiment of the present invention, wherein a check valve assembly is comprised of a valve body and a separate spool pipe.

FIG. 6 illustrates another embodiment of the MVA 110. The reference numerals of the present embodiment are distinguishable from those of the above-described embodiment by a factor of one-hundred (100), but otherwise indicate the same elements as indicated above, except as otherwise specified. The MVA 110 of the present embodiment is substantially similar to that of the earlier embodiment. Therefore, the description of certain similarities between the embodiments may be omitted herein for the sake of brevity and convenience, and, therefore, is not limiting.

A primary difference between the MVAs 10 and 110 is that the control assembly 12 and the check valve assembly 14 of the MVA 10 are comprised of two pieces, whereas the control assembly 112 and the check valve assembly 114 of the MVA 110 are comprised of three-pieces. As shown in FIG. 6, the check valve assembly 114 is comprised of a smaller single piece valve body 134 and a separate spool pipe 131 fluidly connecting the valve body 134 with the control assembly 112. The valve body 134 houses the check valve 130 and includes the second pair of ports (only one shown as 152b) for mounting the test, drain and pressure relief module 132 thereto (the pressure relief valve and the external piping are not shown in FIG. 6). The spool pipe 131 includes the first pair of ports (only one shown as 136a) for mounting the mechanically independent flow detection switch 128 thereto. As shown, the upstream end of the spool pipe 131 is connected with the control assembly 112 via a mechanical coupling 116, and the downstream end of the spool pipe 131 is connected with the valve body 134 via another mechanical coupling 117.

Figure 7:
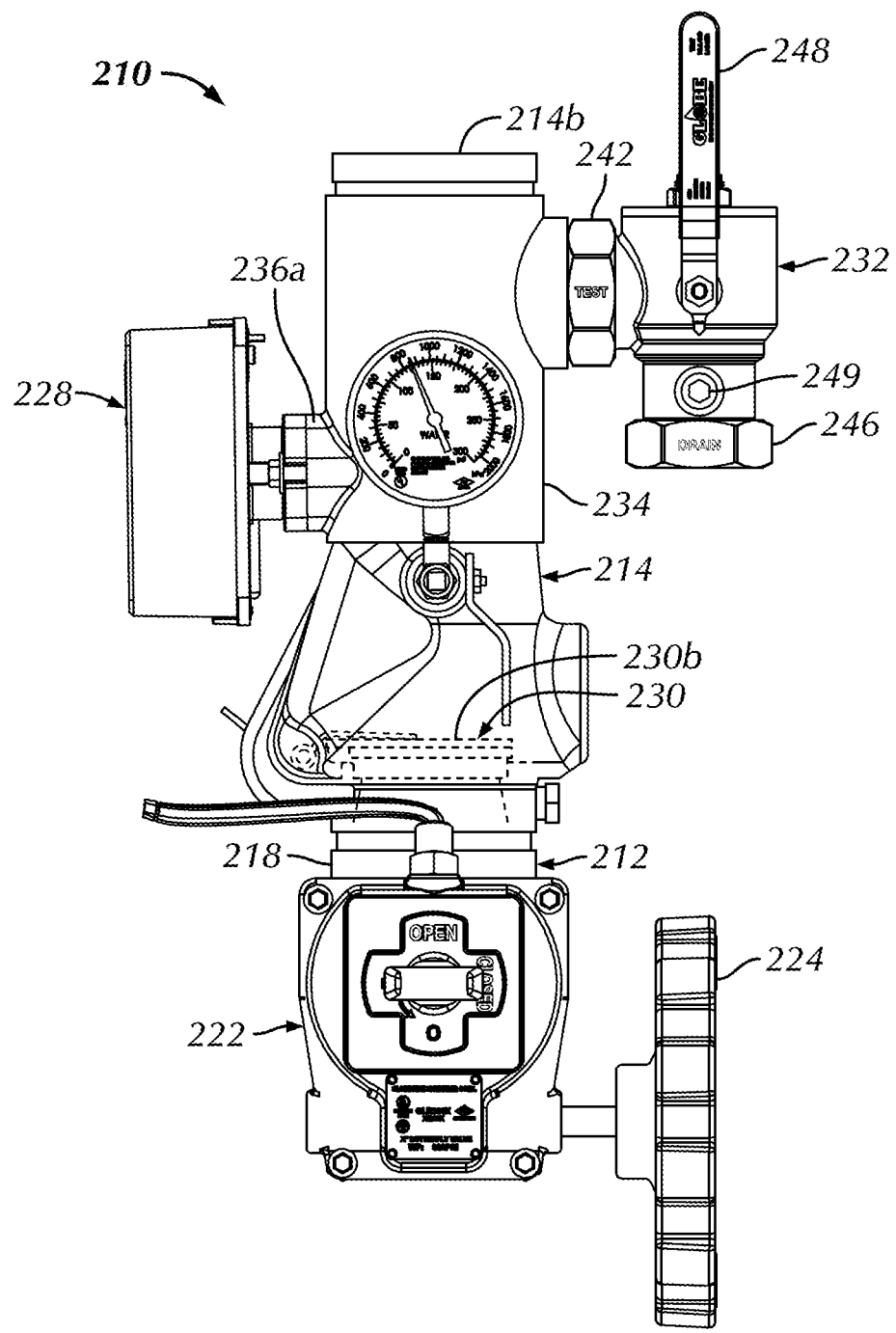
FIG. 7 is a front elevational view of a modular control valve assembly according to a third embodiment of the present invention, wherein a flow detection switch is positioned between a check valve and a test, drain and pressure relief module.

FIG. 7 illustrates another embodiment of the MVA 210. The reference numerals of the present embodiment are distinguishable from those of the above-described embodiment(s) by a factor of two-hundred (200), but otherwise indicate the same elements as indicated above, except as otherwise specified. The MVA 210 of the present embodiment is substantially similar to that of the earlier embodiment(s). Therefore, the description of certain similarities between the embodiments may be omitted herein for the sake of brevity and convenience, and, therefore, is not limiting.

A primary difference between the MVAs 10, 110 and the MVA 210 is the location of the mechanically independent flow detection switch relative to the check valve. As shown in FIG. 7 (the pressure relief valve and the external piping are not shown in FIG. 7), the flow detection switch 228 is positioned downstream of the check valve 230 (shown schematically) and remains upstream of the test, drain and pressure relief module 232. Whether positioned upstream (as in the embodiments of FIGS. 1-6) or downstream (FIG. 7) of the check valve 230, the flow detection switch 228 is capable of detecting water flow from the inlet 212a to the outlet 214b of the MVA 210, and outputting a notification, e.g., sounding an alarm. The flow detection switch 228 remains upstream of the test, drain and pressure relief module 232, and, therefore, remains capable of detecting and notifying when water is being drained out of the MVA 210 through the test, drain and pressure relief module 232.

Figure 8:
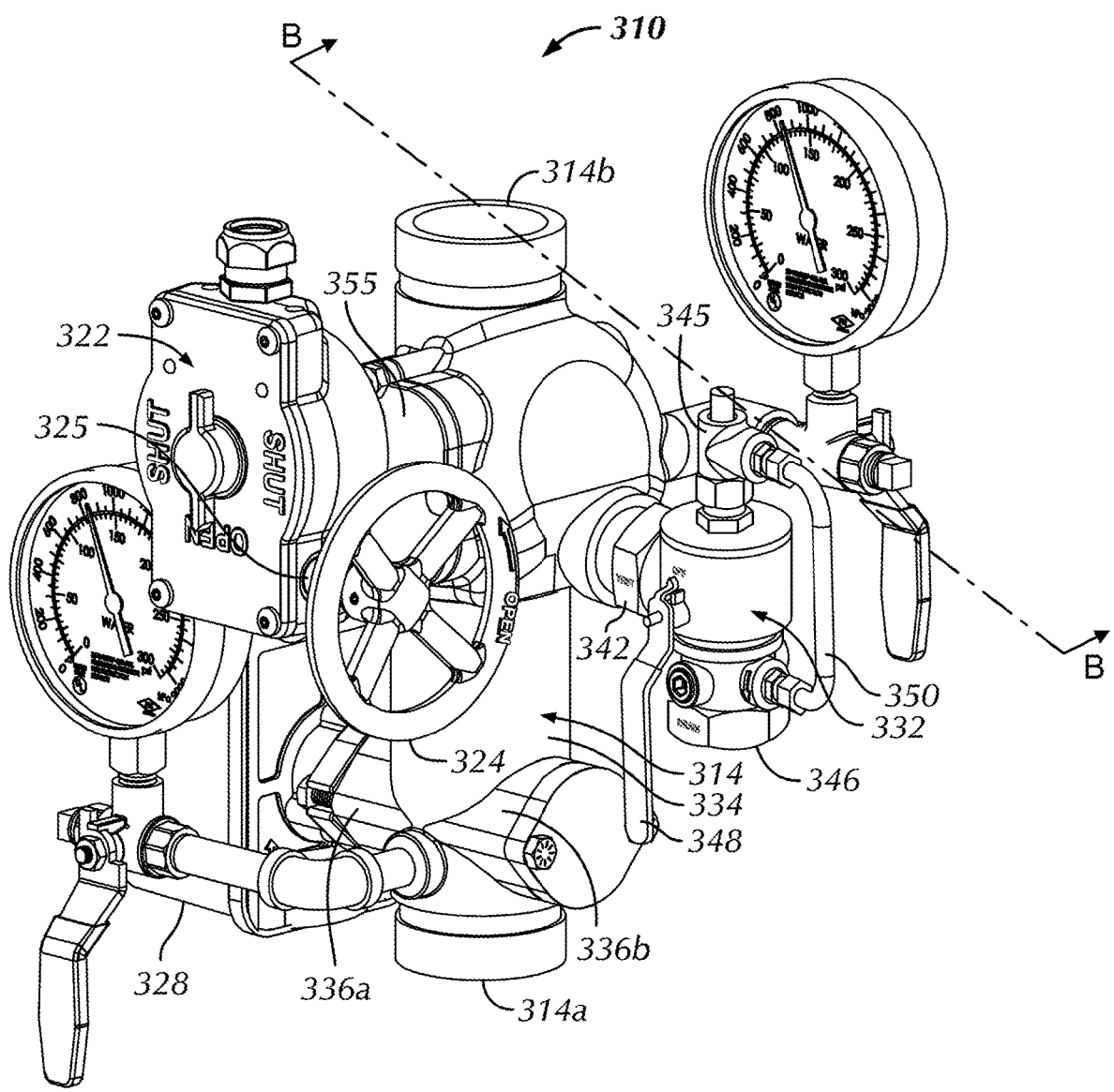
FIG. 8 is a perspective front and side view of a modular control valve assembly according to a fourth embodiment of the present invention, wherein the check valve takes the form of a combination check and control valve.
Figure 9A:
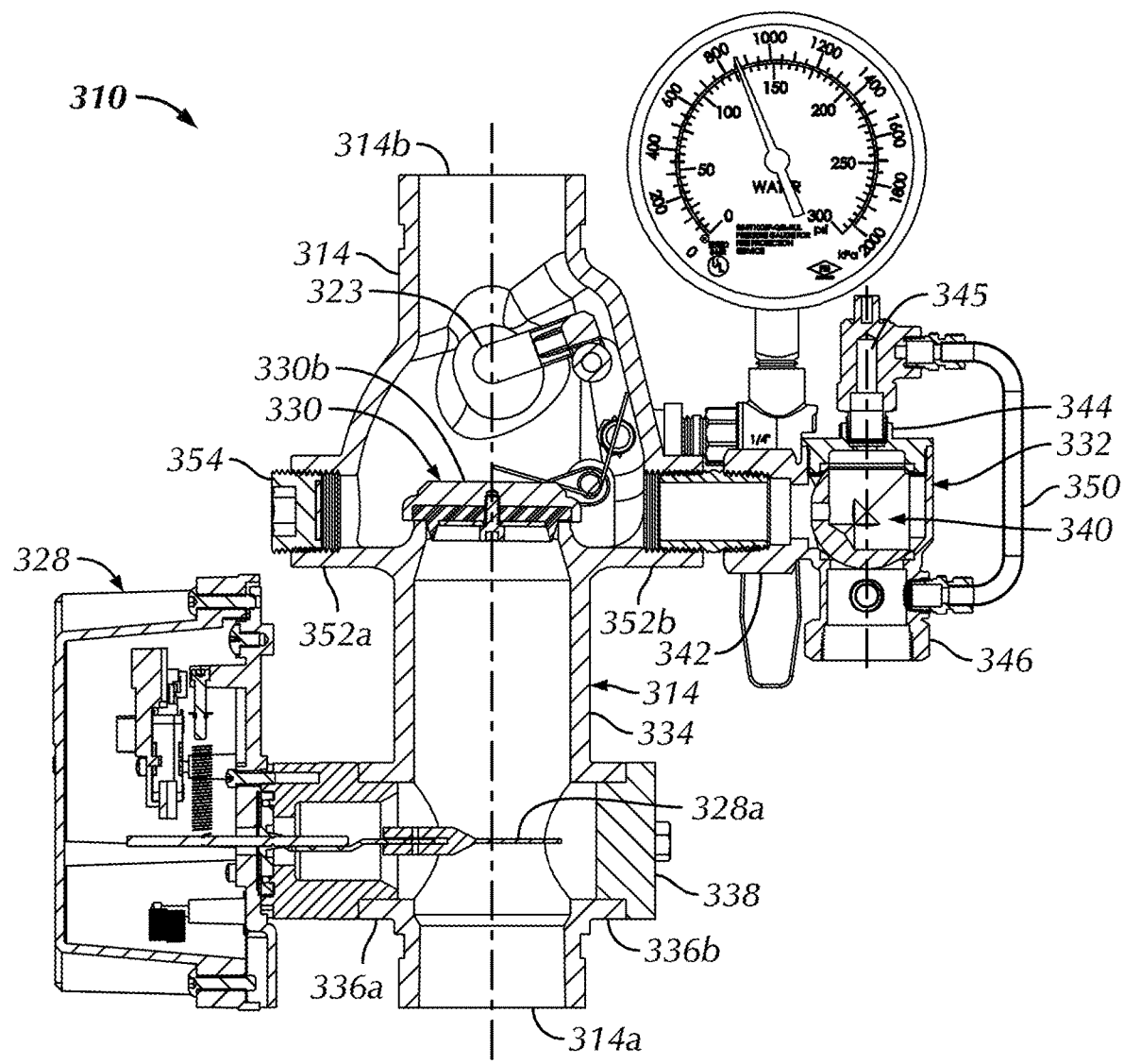
FIG. 9A is a cross-sectional view of the modular control valve assembly of FIG. 8, taken along the sectional line B-B of FIG. 8, wherein the flow detection switch is positioned upstream of both the check valve and the test, drain and pressure relief module, and wherein an actuator arm operatively associated with the check valve is oriented in a first position thereof.
Figure 9B:
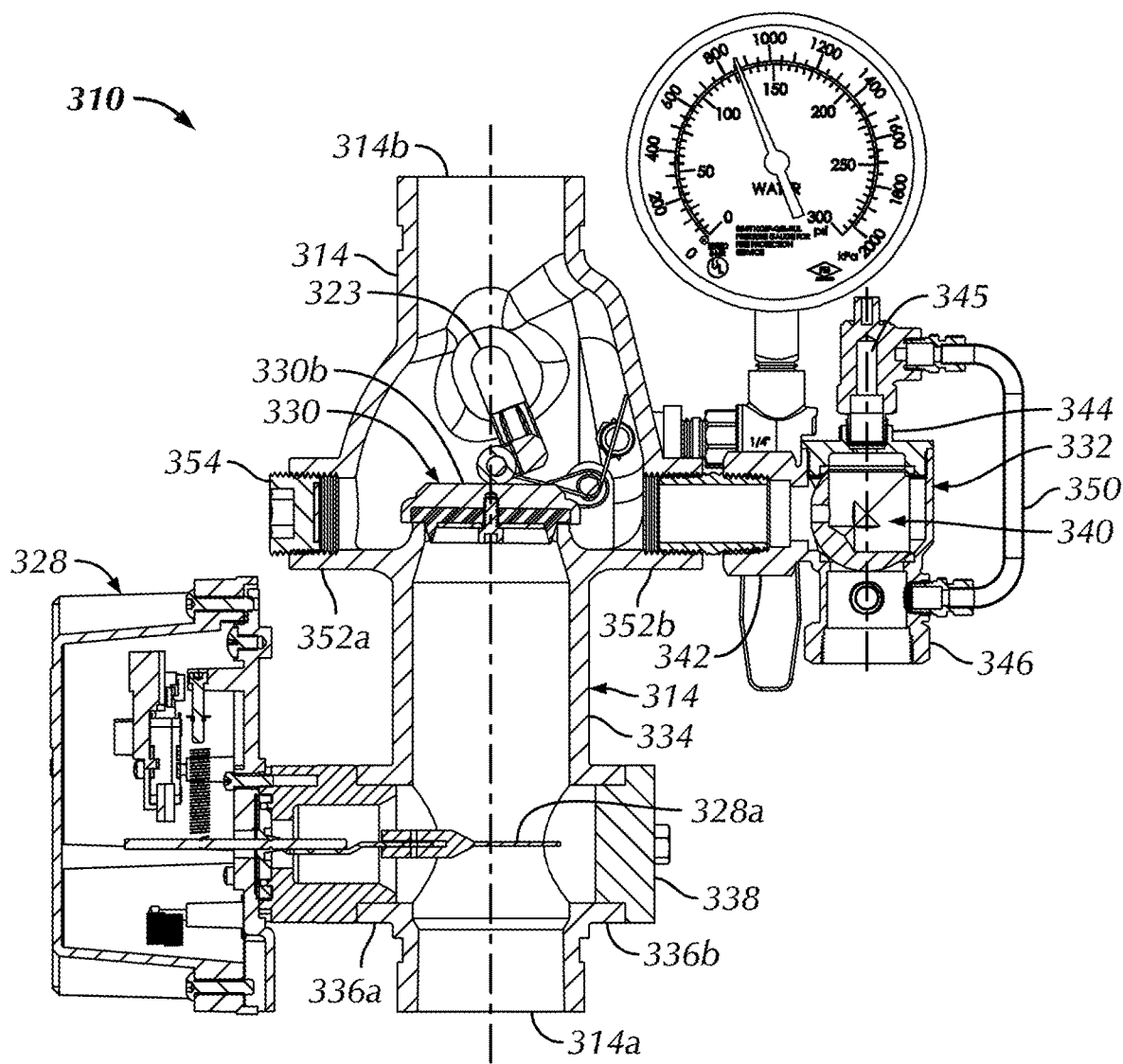
FIG. 9B is a cross-sectional view of the modular control valve assembly of FIG. 8, taken along the sectional line B-B of FIG. 8, wherein the flow detection switch is positioned upstream of both the check valve and the test, drain and pressure relief module, and wherein the actuator arm is oriented in a second position thereof.
Figure 10:
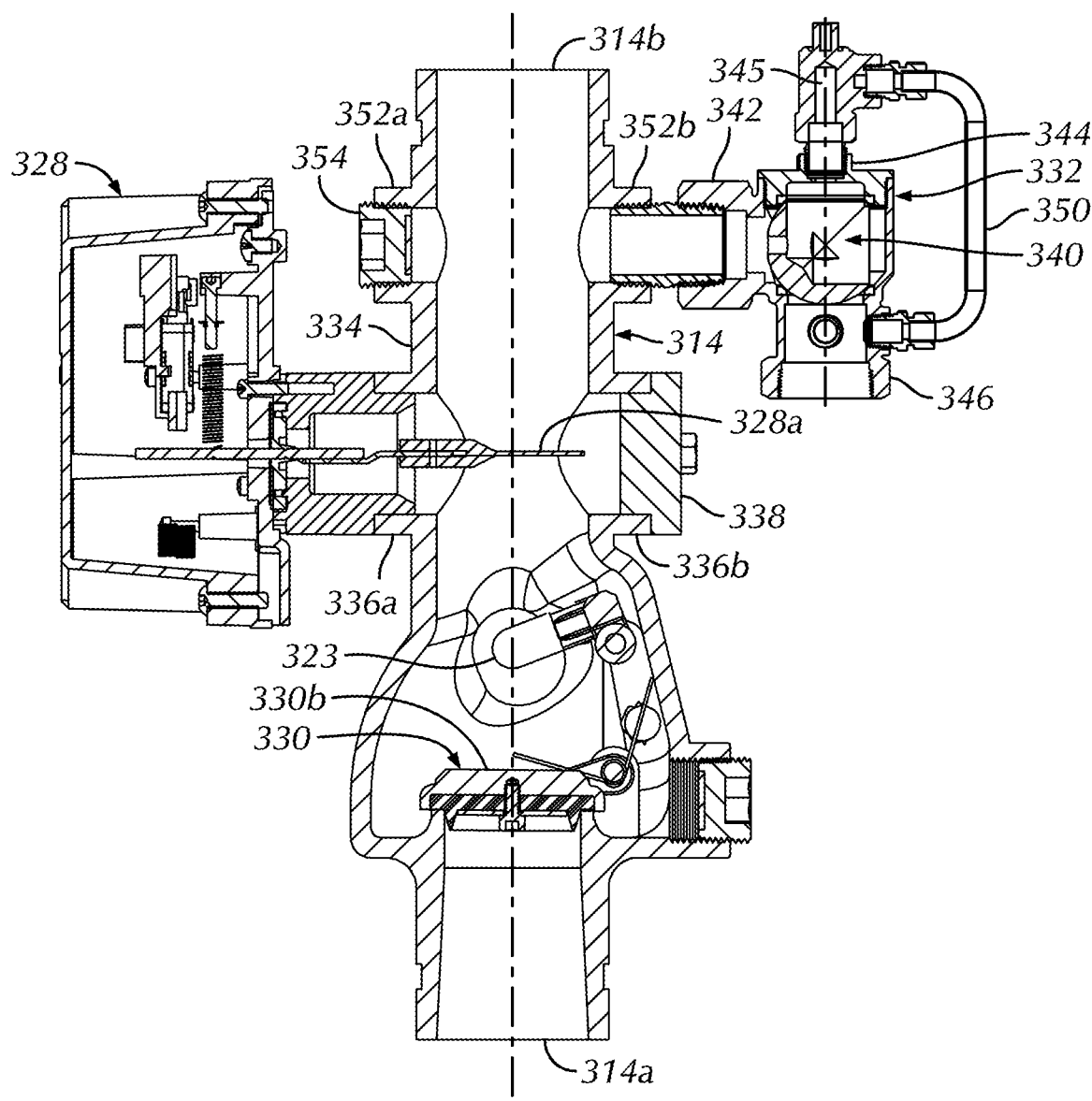
FIG. 10 is a cross-sectional view of an alternative configuration of the modular control valve assembly of FIG. 8, taken along the sectional line B-B of FIG. 8, wherein the flow detection switch is positioned between the check valve and the test, drain and pressure relief module, and wherein the actuator arm is oriented in the first position thereof.

FIGS. 8-10 illustrate another embodiment of the MVA 310. The reference numerals of the present embodiment are distinguishable from those of the above-described embodiment(s) by a factor of three-hundred (300), but otherwise indicate the same elements as indicated above, except as otherwise specified. The MVA 310 of the present embodiment is substantially similar to that of the earlier embodiment(s). Therefore, the description of certain similarities between the embodiments may be omitted herein for the sake of brevity and convenience, and, therefore, is not limiting.

A primary difference between the MVAs 10, 110, 210 and the MVA 310 is that the check valve 330 of the MVA 310 takes the form of a combination check and control valve, thereby eliminating the separate control assembly 12, 112, 212 of the respective MVAs 10, 110, 210. As shown, the valve body 334 further comprises an actuator arm 323 rotatably supported in the valve body 334. The actuator arm 323 is rotatable between a first position (FIG. 9A) and a second position (FIG. 9B). In the first position thereof, the actuator arm 323 is oriented out of an operational range of movement of the check valve 330 such that the clapper disk 330b of the check valve 330 is freely movable between the open and closed positions thereof according to the pressure differential across the clapper disk 330b. In the second position of the actuator arm 323, the actuator arm 323 engages, orients and maintains the clapper disk 330b of the check valve 330 in the closed position thereof, irrespective of the pressure differential across the clapper disk 330b. A selectively rotatable control arm 325 (FIG. 8) is operatively coupled with the actuator arm 323 to move the actuator arm 323 between the first and second positions thereof. As one example of an actuator arm 323, without limitation, the actuator arm 323 may take the form of the actuator arm described in U.S. patent application Ser. No. 15/298,758, filed Oct. 20, 2016 and entitled "Control Valve Assembly," which is assigned to the assignee of the present application and is hereby incorporated by reference in its entirety, as if fully set forth herein.

Similarly to the check valve 330, the actuator arm 323 may be removably mounted in the valve body 334. For example, without limitation, one end of the actuator arm 323 may be removably journaled in a bore (not shown) of the valve body 334 opposite the mounting plate 355. The opposing end of the actuator arm 323 extends into the valve actuation assembly 322 (FIG. 8), through the mounting plate 355. Therefore, the opening in the sidewall of the valve body 334 (not shown) is also sized and dimensioned to receive the actuator arm 323 therethrough.

As shown, the mechanically independent flow detection switch 328 is removably mounted to the valve body 334 upstream of the test, drain and pressure relief module 332. In the illustrated embodiment of FIGS. 8-9B, the flow detection switch 328 is also mounted upstream of the combination check and control valve 330, in like manner as explained with respect to the embodiment of FIGS. 1-5. Alternatively, in another configuration, the flow detection switch 328 may alternatively be removably attached to the valve body 334 between the test, drain and pressure relief module 332 and the combination check and control valve 330, as shown in FIG. 10. The test, drain and pressure relief valves may be combined into a single module 332 (as shown) or may alternatively be separately and removably attached to the MVA 310. As a further alternative, one or more of the test, drain and pressure relief valves may be separately attached to the piping system network, upstream or downstream of the MVA 310 in a conventional manner.

Figure 11:
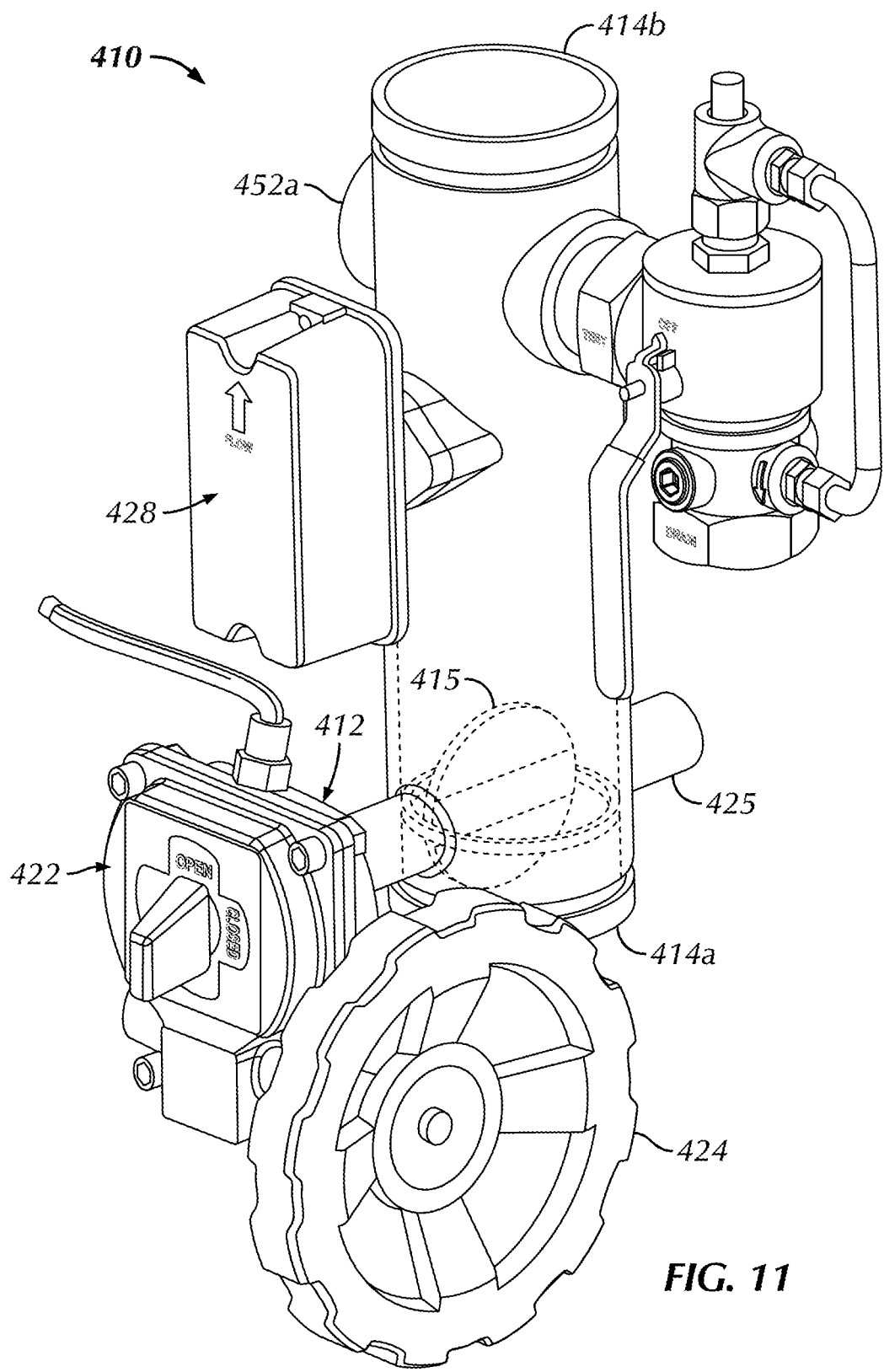
FIG. 11 is a perspective front and side view of a modular control valve assembly according to a fifth embodiment of the present invention, wherein the control valve assembly does not include a pressure actuated check valve and wherein the flow detection switch is positioned between the control valve and the test, drain and pressure relief module.
Figure 12:
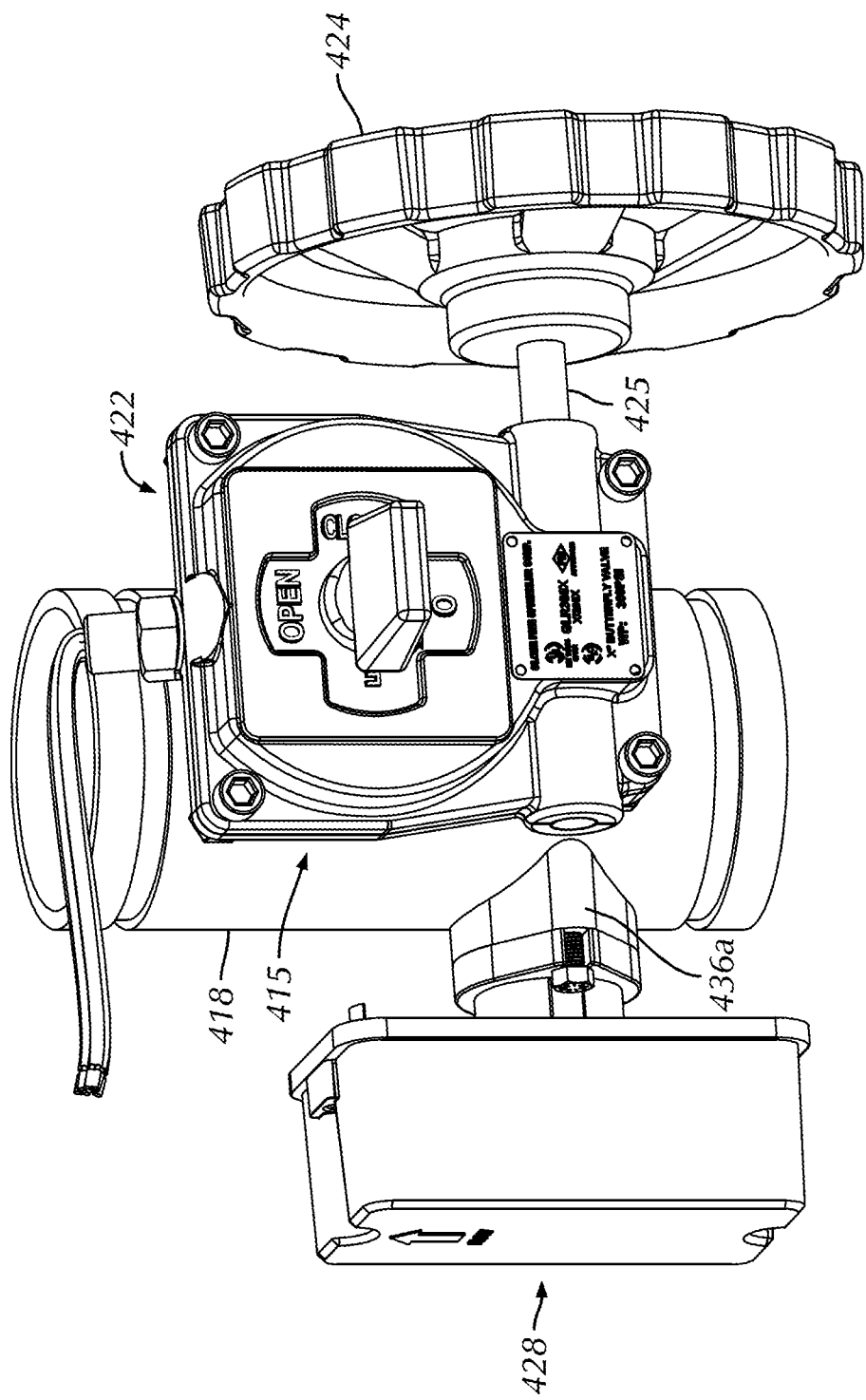
FIG. 12 is a partial perspective front and side view of an alternative configuration of the modular control valve assembly of FIG. 11, wherein the flow detection switch is positioned upstream of the control valve.

FIGS. 11-12 illustrate another embodiment of the MVA 410. The reference numerals of the present embodiment are distinguishable from those of the above-described embodiment(s) by a factor of four-hundred (400), but otherwise indicate the same elements as indicated above, except as otherwise specified. The MVA 410 of the present embodiment is substantially similar to that of the earlier embodiment(s). Therefore, the description of certain similarities between the embodiments may be omitted herein for the sake of brevity and convenience, and, therefore, is not limiting.

A primary difference between the MVAs 10, 110, 210, 310 and the MVA 410 is that the MVA 410 does not include a pressure actuated check valve. Rather, the three main components of the MVA 410 are a test, drain, and pressure relief module 432, a mechanically independent flow detection switch 428 and a control valve assembly 412 which controls manual shut-off of the MVA 410. Similarly to the MVA 10, the MVA 410 comprises a valve body 418 with a control valve 415 within the valve body 418 having a selectively rotatable control arm 425 operatively coupled therewith to move the control valve 415 between an open position, permitting fluid flow across the control valve, and a closed position, substantially preventing fluid flow across the control valve 415. The control valve may take the form of a butterfly control valve (FIG. 4), but the disclosure is not so limited. Clockwise and counterclockwise rotation of the hand wheel 424 connected to the control arm 425 pivots the butterfly valve disk 419 between the open and closed positions thereof in a manner well understood by those of ordinary skill in the art.

As shown in FIG. 11, a test, drain and pressure relief module 432 is removably mounted to the valve body 418 downstream of the control valve 415. A flow detection switch 428 is removably mounted to the valve body 418 between the test, drain and pressure relief module 432 and the control valve 415, as shown in FIG. 11. The test, drain and pressure relief valves may be combined into a single module 432 (as shown) or may alternatively be separately and removably attached to the MVA 410. In the illustrated embodiment of FIG. 11, the valve body 418 is a single piece valve body. Alternatively, in another configuration as shown in FIG. 12, the flow detection switch 428 may be removably mounted to the valve body 418 upstream of the control valve 415. As a further alternative, one or more of the test, drain and pressure relief valves may be separately attached to the piping system network, upstream or downstream of the MVA 410 in a conventional manner.

It will be appreciated by those skilled in the art that changes could be made to the embodiments described above without departing from the broad inventive concept thereof. In some embodiments, for example, without limitation, the butterfly control valve may be positioned downstream of the check valve. As another example, without limitation, the control assembly may be mounted downstream of the check valve assembly. For example, although the use of the present invention is disclosed as a valve assembly for fire protection sprinkler systems, it will be appreciated that the modular valve assemblies of the present invention would have wide application in the control and monitoring of other fluids in other fields. It is understood, therefore, that this invention is not limited to the particular embodiments disclosed, but it is intended to cover modifications within the spirit and scope of the present invention, as set forth in the appended claims.

We claim:

1. A wet piping system modular valve assembly comprising a single piece valve body; a control valve within the valve body having a selectively rotatable control arm operatively coupled therewith to move the control valve between an open position, permitting fluid flow across the control valve, and a closed position, substantially preventing fluid flow across the control valve irrespective of a pressure differential across the control valve; a removable drain valve in contact with the valve body and fluidly connected with the valve body downstream of the control valve; and a mechanically independent flow detection switch removably mounted to the valve body and fluidly connected with the valve body upstream of the drain valve, wherein the valve body includes a first pair of generally oppositely disposed ports extending through a sidewall of the valve body and in fluid communication with an interior of the valve body, the flow detection switch being selectively mountable to either one of the first pair of ports, and the valve body includes a second pair of generally oppositely disposed ports extending through the sidewall of the valve body and in fluid communication with the interior of the valve body, the second pair of ports being positioned downstream of the first pair of ports, and the drain valve being removably coupled to either one of the second pair of ports.

2. The valve assembly of claim 1, wherein the flow detection switch is fluidly connected to the valve body upstream of the control valve.

3. The valve assembly of claim 1, wherein the flow detection switch is fluidly connected to the valve body downstream of the control valve.

4. The valve assembly of claim 1, wherein one port of the first pair of ports that is not mounted with the flow detection switch is sealed shut with a removably mounted sealing adapter.

5. The valve assembly of claim 1, wherein one port of the second pair of ports that is not coupled with the drain valve is sealed shut with a removably mounted sealing adapter.

6. The valve assembly of claim 1, wherein the control valve is a butterfly valve.

7. The valve assembly of claim 1, further comprising a pressure relief valve coupled to the valve body.

8. The valve assembly of claim 7, wherein the drain and pressure relief valves are combined into a single module.

* * * * *